US009582337B2

(12) United States Patent
Malki et al.

(10) Patent No.: US 9,582,337 B2
(45) Date of Patent: Feb. 28, 2017

(54) CONTROLLING RESOURCE CONSUMPTION

(75) Inventors: Eliran Malki, Givat Shmuel (IL); Irad Deutsch, Beer Sheva, IL (US)

(73) Assignee: Pivotal Software, Inc., San Francisco, CA (US)

( * ) Notice: Subject to any disclaimer, the term of this patent is extended or adjusted under 35 U.S.C. 154(b) by 1201 days.

(21) Appl. No.: 12/467,387

(22) Filed: May 18, 2009

(65) Prior Publication Data

US 2009/0282406 A1    Nov. 12, 2009

Related U.S. Application Data

(63) Continuation of application No. PCT/IL2007/001621, filed on Dec. 27, 2007.

(60) Provisional application No. 60/871,994, filed on Dec. 27, 2006.

(51) Int. Cl.
  *G06F 9/50* (2006.01)
  *G06F 9/46* (2006.01)
  *G06F 9/48* (2006.01)

(52) U.S. Cl.
  CPC ............ *G06F 9/5083* (2013.01); *G06F 9/485* (2013.01); *G06F 9/466* (2013.01); *G06F 9/5011* (2013.01); *G06F 9/5027* (2013.01)

(58) Field of Classification Search
  CPC . G06F 9/50; G06F 9/466; G06F 9/485; G06F 9/4881
  See application file for complete search history.

(56) References Cited

U.S. PATENT DOCUMENTS

| | | | |
|---|---|---|---|
| 6,341,303 B1 | 1/2002 | Rhee et al. | |
| 6,457,008 B1 | 9/2002 | Rhee et al. | |
| 7,020,878 B1 | 3/2006 | Rhee et al. | |
| 7,058,947 B1* | 6/2006 | Raja | G06F 9/5027 709/223 |
| 7,159,184 B2* | 1/2007 | Ullah et al. | 715/762 |
| 7,356,817 B1* | 4/2008 | Cota-Robles | G06F 9/45537 710/262 |

(Continued)

FOREIGN PATENT DOCUMENTS

| | | |
|---|---|---|
| GB | 2 366 891 | 3/2002 |
| WO | 2004036344 A2 | 4/2004 |

OTHER PUBLICATIONS

University of Glasgow (implementing scheduling algorithms, real time and embedded systems (M) lecture 9; May 24, 2006 ; University of Glasgow; pp. 1-29).*

(Continued)

*Primary Examiner* — Abdullah Al Kawsar
*Assistant Examiner* — Caroline H Arcos
(74) *Attorney, Agent, or Firm* — Fish & Richardson P.C.

(57) ABSTRACT

A method of controlling resource consumption of running processes, sub processes and/or threads (such as a database or an application transaction) in a computerized system, in which resources consumed by less important processes are freed by periodically suspending (by causing them to demand less resources) and resuming these processes transparently to other entities of the computerized system and externally to the OS without intervention in its inherent resource allocation mechanism and allowing the OS of the computerized system to allocate the free resources to other running processes.

18 Claims, 6 Drawing Sheets

(56) References Cited

U.S. PATENT DOCUMENTS

| | | | |
|---|---|---|---|
| 7,784,054 B2* | 8/2010 | Monasterio | 718/105 |
| 8,046,763 B1* | 10/2011 | Czajkowski et al. | 718/104 |
| 2003/0126416 A1 | 7/2003 | Marr et al. | |
| 2004/0187120 A1* | 9/2004 | Moore et al. | 718/100 |
| 2004/0215473 A1* | 10/2004 | Bhogi et al. | 705/1 |
| 2005/0071572 A1* | 3/2005 | Nakashima et al. | 711/137 |
| 2005/0091668 A1 | 4/2005 | Cargille et al. | |
| 2005/0177820 A1 | 8/2005 | Mei et al. | |
| 2005/0235285 A1 | 10/2005 | Monasterio | |
| 2007/0157201 A1* | 7/2007 | Schmidt et al. | 718/100 |

OTHER PUBLICATIONS

Lawall, J.L. et al. (2004) "Language Design for Implementing Process Scheduling Hierarchies", ACM SIGPLAN 2004 Symposium on Partial Evaluation and Program Manipulation—PEPM'04, Verona, Italy, Aug. 24-26, 2004; pp. 1-12.

Floss, K., (Nov./Dec. 2004) "Database Resource Manager," Oracle Magazine Technology Network.

CPULimit, SourceForge, Inc., http://cpulimit.sourceforge.net.

EPO Extended Search Report 2011 (5 pages).

Julia L. Lawall et al, (2004) "Language Design for Implementing Process Scheduling Hierarchies;" Symposium on Partial Evaluation and Program Manipulation, Aug. 24-26, 2004.

Anonymous: "Scheduling (computing)", Nov. 28, 2006, XP055170511, Wikipedia, the free encyclopedia Retrieved from the Internet: URL:http://en.wikipedia.org/w/index.php?title=Scheduling_(computing)&oldid=90752934 [retrieved on Feb. 18, 2015].

\* cited by examiner resource consumptions time pie charts

CONTROLLING RESOURCE CONSUMPTION

CROSS-REFERENCE TO RELATED APPLICATIONS

This application is a continuation of United States Patent Application Serial No. PCT/IL2007/01621 (filed Dec. 27, 2007, pending), which application claims priority to U.S. Patent Application Ser. No. 60/871,994 (filed Dec. 27, 2006), both of which applications are herein incorporated by reference in their entirety.

BACKGROUND OF THE INVENTION

Field of the Invention

The present invention is related to computer resources management. More particularly, the invention is related to a method for providing prioritizing to important processes by controlling respective resource consumption of processes and transactions (such as processes of the operating system, application processes, database transactions, network activity, I/O requests) and for allocating more resources to one or more processes at the expense of the others.

Description of Related Art

In any given computerized system, a set of processes/transactions compete for resources. For example, processes that are related to the Central Processing Unit (CPU), Input/Output (I/O) devices (the communication the computer and the user or another information processing system), network resources, or any other shared computer resource. A "heavy" process which requires many resources causes the other processes to slow down or stop (e.g., not to respond) due to lack of available resources. Such processes/transactions may include:

A process that is a part of an Operating System (e.g., Windows, UNIX, Linux, OS2), such as device drivers, kernel (the core that provides basic services for all other parts of the operating system), services, daemons (A daemon is a program that runs continuously and exists for the purpose of handling periodic service requests that a computer system expects to receive).

An application process: any process or sub-process (such as a thread—a placeholder information associated with a single use of a program that can handle multiple concurrent users. It allows a program to know which user is being served as the program alternately gets re-entered on behalf of different users) that is running in an operating system. For instance, computer games, antivirus, Office tools, utilities, mail servers, ERP applications, etc.

Database Transaction—a database operation (such as SELECT/INSERT/UPDATE/DELETE) or a set of operations.

Network Traffic—a stream of IP packets from any source to any destination.

I/O Traffic—a stream of I/O operations between a computer and a storage or an I/O device.

All the conventional systems described above have not yet provided satisfactory solutions to the problem of dynamically prioritizing important processes executed by a computerized system and for allocating more resources to such processes.

It is therefore an object of the present invention to dynamically prioritize important processes executed by a computerized system and for allocating more resources to such processes at the expense of the others.

It is another object of the present invention to improve performance and to maintain a normal level of performance and response time to users while heavy transactions are running in the background.

It is a further object of the present invention to improve performance and to free resources for important users/actions.

It is still another object of the present invention to improve performance and to improve protection and stability of applications against heavy transactions/operations that may cause a "Denial-of-Service" (DoS).

It is yet another object of the present invention to more effectively handle peak demands and for reducing the peak stress from the computerized system.

It is a further object of the present invention to improve performance and maintain a desired Quality of Service (QoS) for one or more transactions.

Other objects and advantages of the invention will become apparent as the description proceeds.

SUMMARY OF THE INVENTION

The present invention is directed to a method of controlling resource consumption of running processes, sub processes and/or threads (such as a database or an application transaction) in a computerized system. Accordingly, resources consumed by less important processes are freed by periodically suspending (by causing them to demand less resources) and resuming these processes transparently to other entities of the computerized system and externally to the OS without intervention in its inherent resource allocation mechanism and allowing the OS of the computerized system to allocate the free resources to other running processes.

The amount of resources consumed by a running process is preferably controlled by repeatedly limiting its demand for system resources for a first period, during which no demand is presented and a second period, during which the preceding demand is resumed, until the process is finished. In order to control the system resources given to a process, allocation of execution time units is used instead of allocating CPU and/or I/O cycles.

Preferably, processes are accelerated by slowing down other processes. Running processes may be accelerated or slowed down by using a GUI (e.g., a sliding virtual throttle) for controlling the resources allocated to them. Suspending running processes may be carried out through an inherent API, a debugger or directly through the OS system calls. or by using a binary code or any other representation of a command for suspending and resuming processes.

The amount of consumed resources may be controlled for a process that is already running and consuming resources. Preferably, the amount of resources consumed by an application is controlled by a set of rules, which can be determined externally to this application.

The present invention is also directed to computerized system, in which resource consumption of running processes sub processes and/or threads are controlled by freeing resources consumed by one or more processes by periodically suspending and resuming said one or more processes and allowing said computerized system to allocate the free resources to other running processes.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

The present invention is directed to a method of controlling computerized resources, based on allocating chunks of execution time in order to control the system resources given to a process. Generally, the method is based on stopping and resuming the transactions and processes on the fly in real-time, and by limiting the consumption of computer resources to some processes while allocating more resources to other transactions in the system, without requiring a priority level to be determined on launching the processes.

Different embodiments of the present invention additional intend to:

Improve Performance: Maintain a normal level of performance and response time to users while heavy transactions are also running in the background.

Resource Handler: Free resources for important users/actions on the expense of others.

Improve Protection & Stability: Protect the DB/OS/Application from heavy transactions/operations that may cause a "Denial-of-Service" (DoS). Such processes may consume all resources while leaving nothing to other processes (such as excessive CPU consumption by a looping (executing the same set of instructions a given number of times or until a specified result is obtained) application, antivirus, background process, etc.).

Priorities: Prioritize users, clients, queries, etc., in the database/OS/Application based on various factors.

Handling Peak: Taking a peak demand for resources and distributing it over a greater timescale, and by that, reducing the peak stress from the system.

Figure 1:
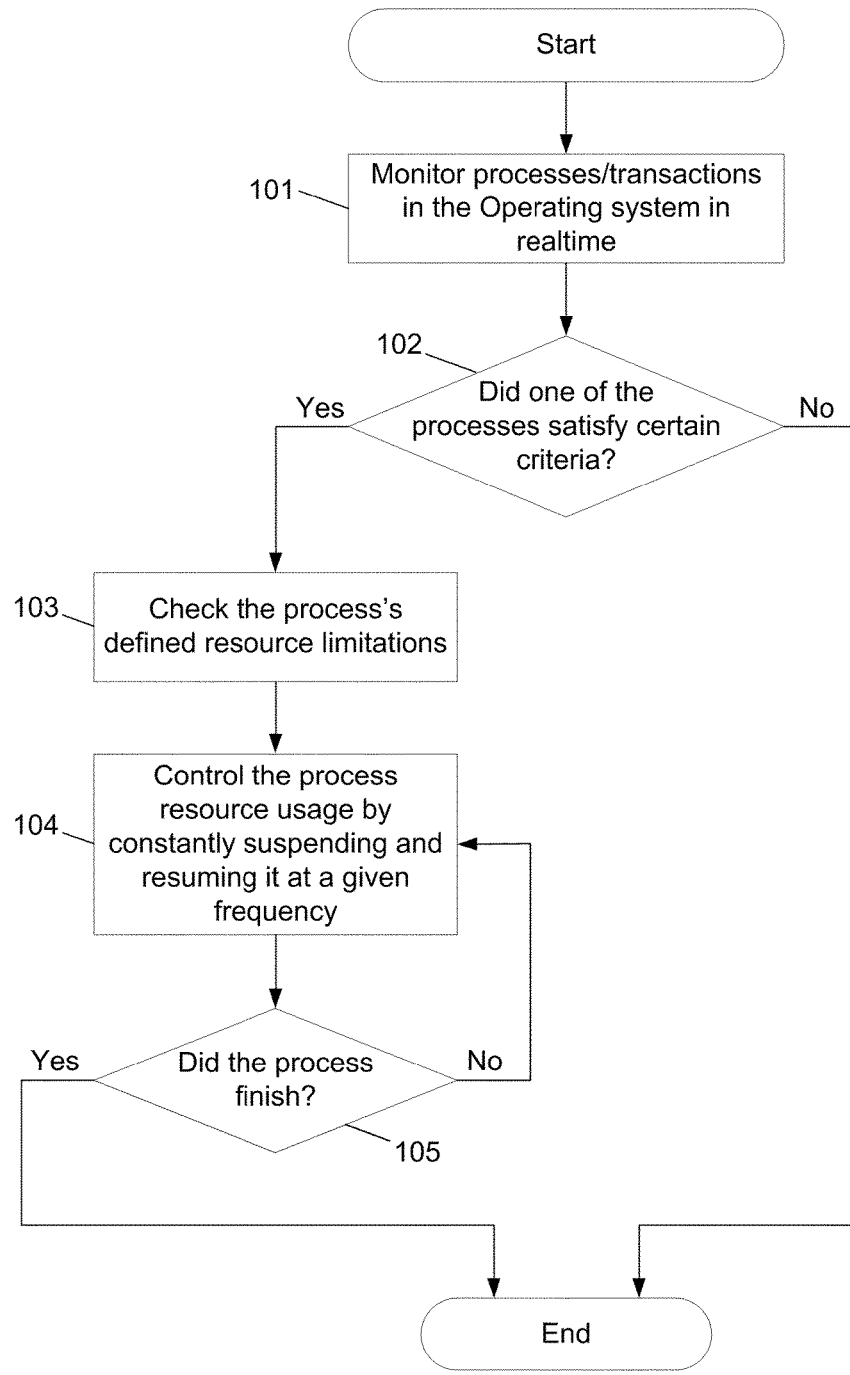
FIG. 1 is a general flowchart of controlling the resource consumption of a process, according to a preferred embodiment of the invention.

FIG. 1 is a general flowchart of controlling the resource consumption of a process, according to a preferred embodiment of the invention. At the first step 101, the processes and transactions in the Operating System are monitored in real-time. At the next step 102, assessment is made to decide whether or not one of the running processes satisfies one or more criteria associated with a need for resource consumption control. If it is, then at the next step 103 the system checks the predefined resource limitations for that process. At the next step 104, the resources for that process is controlled by periodically suspending and resuming it at a predetermined frequency, while each time checking at step 105 if the process is still running, until it is completed. Conventional methods for resource management in which requests of processes for resources are managed without prioritizing more important processes entail a situation where inherent CPU and/or I/O algorithms allocate, inter alia, high amount of resources to processes that increase the load but are not necessarily important. This causes many other processes to get a little amount of resources, until freezing or denial of service. In contradiction, the method proposed by the present invention allows all processes to run and new processes to start running by optimally managing the resources allocated to them such that less important processes get less resources, to thereby free resources for allowing more important processes to run at the same rate or faster, while avoiding denial of any request.

Figure 2:
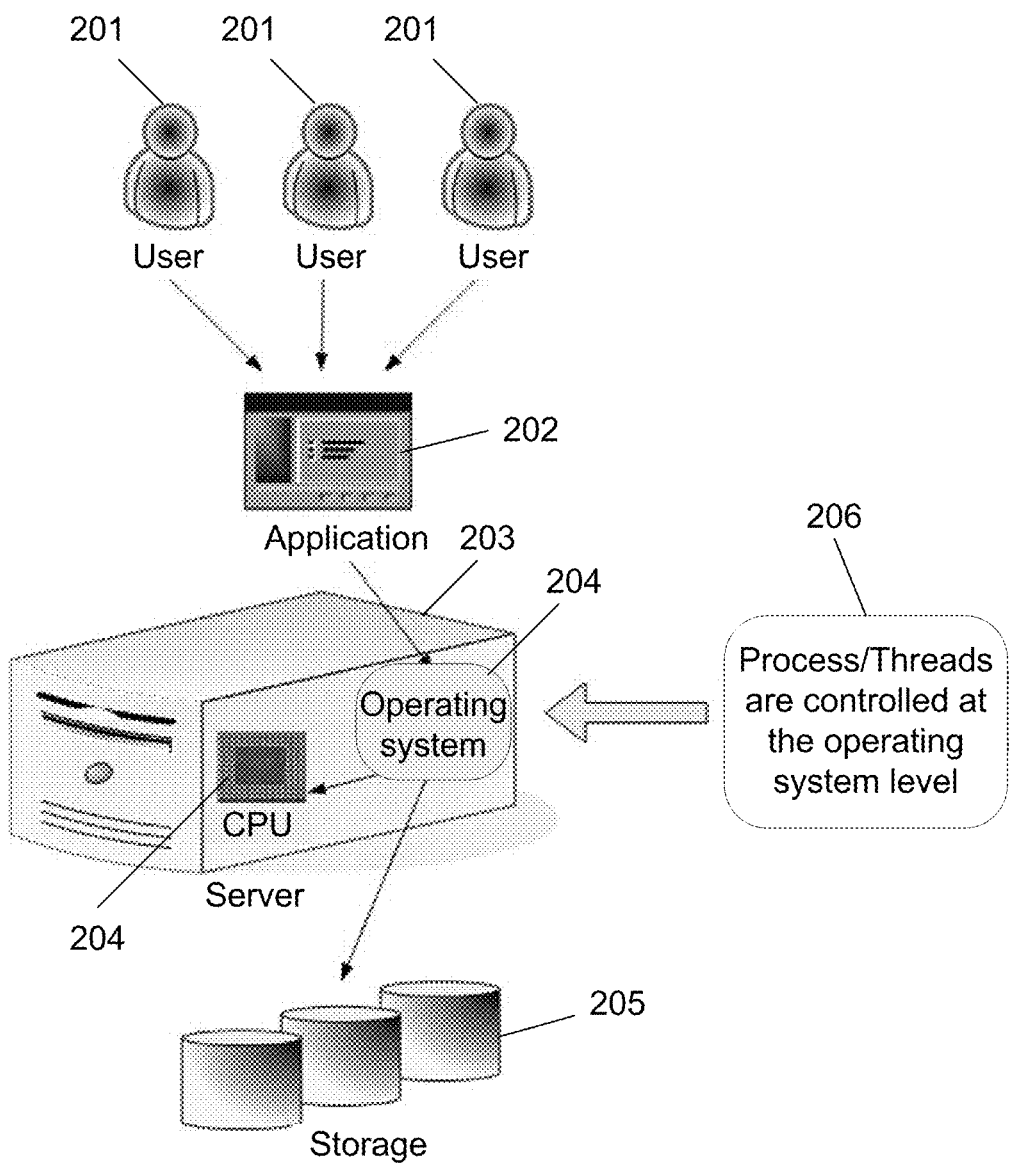
FIG. 2 schematically illustrates a: general architecture of a computerized system, in which resource consumption of processes can be controlled, according to a preferred embodiment of the invention.

FIG. 2 schematically illustrates a: general architecture of a computerized system, in which resource consumption of processes can be controlled, according to a preferred embodiment of the invention. In this example, several users 201 are connected to an application 202 that runs on a server 203. Normally, resource allocation is carried out by the operating system, which controls the operation of the CPU 204 and the mass storage devices (the hard disks) 205. According to the present invention, a unique interface 206 is added for controlling the operation of corresponding processes/threads at the operating system level. This interface is adapted to each environment, since the processes/threads may vary from one environment (i.e., Operating System) to another. It is possible to connect to the operating system through its standard Application Programming Interface (API, which is the method prescribed by a computer operating system by which a programmer writing an application program can make requests of the operating system). For example, intervention can be achieved by adding a "stop" command whenever required using the inherent debugging feature (a process of locating and fixing or bypassing bugs/errors in computer program code) which exists in each operating system. The method proposed by the present invention uses the debugger to manipulate and manage resource consumption. For example, several more important processes are self accelerated by causing less important processes to cancel their demand for resources for pre-defined time periods. As a result, the operating system will allocate the free resources to the other running processes which are more important. This is carried out without actual intervention in the inherent resource allocation mechanism of the operating system (the result is manipulated, rather than the operations of the OS).

Resource control is based on the following steps of identifying and controlling transaction/process within a given environment:

Step 1: Collecting Statistics Regarding Transactions/Processes

In order to control the resource consumptions of a given process/transaction, the system is monitored by any conventional existing method. For example, in an Oracle database, an internal database views and delivers various factors and statistics regarding transaction (such as username, connected terminal, transaction content, amount of resources used, etc.). Internal commands or even third party tools can be used, for example, in order to collect statistics about running processes/transactions and target those that need their resources to be controlled.

Step 2: Crossing Statistics with Resource Rules

The next step is to cross the statistics collected in the previous step 1 to a set of Rules. A rule is defined as a set of thresholds for each gathered statistic/factor. For example, if a transaction is currently active, doing more than 1000 physical reads per second, scanning table "X" or is running during the peak hours (10:00 am-4:00 pm), its resource consumption is reduced to 20%. According to another example, if a process is executed by the manager of an enterprise, it has been running for 5 minutes and has not been completed yet while other processes were also executed by the employees, then the resource consumption of the other processes (of the employees) is reduced to 20%. According to another example, if a process is an "Anti Virus" that is working while Office tools are running, then its resource consumption is reduced to 5%.

Step 3: Controlling Transaction Resources Usage

In this step the transaction resource consumptions is controlled by allocating chunks of execution times. The method of allocating chunks of execution, according to embodiments of the present invention is based on suspending and resuming the processes, which can be done in several ways in a computerized system.

Generally, resource control is based on identifying the exact process/thread at the operating system level that is running and managing the transaction. Then, the process/thread is suspended and resumed in a frequency that is defined by the rule, causing the effect of slowing it down and controlling the amount of resource it uses. The following examples illustrate how to use the method proposed by the present invention in different environments.

Example 1

Limiting Resource Consumption of One Process to 20% in an Oracle Database

In this example, the process/thread in the Operating System that performs the transaction is identified and suspended it for 4 seconds using ORADEBUG SUSPEND command (through SQLPLUS utility). Then it is resumed for 1 second using ORADEBUG RESUME command. The Suspend/Resume operations are repeated until the transaction is completed. The advantage in database applications is that according the proposed method, a transaction is first identified in the database and then in the operating system. Then, the resources allocated to this transaction are managed in the OS. The result is that the load in the database is affected without managing the database.

Example 2

Limiting Resource Consumption of One Process to 20% in a Unix/Linux Environment

In this example, the process/thread in the Operating System that performs the transaction is identified and suspended it for 4 seconds using "KILL-STOP" command (in the shell environment). Then it is resumed for 1 second using "KILL-CONT" command. The STOP/CONT operations are repeated until the transaction is completed. Alternatively, this may be done by using directly the signal code number. For example: "KILL-23" & "KILL-25" command in Solaris OS (of Sun Microsystems), or "KILL-17" & "KILL-19" command in Free BSD (free and open source operating system that is based on the Berkeley Software Distribution (BSD) version of the Unix operating system) or some Linuxes.

The KILL command is used at the "Shell" (the interactive user interface with UNIX operating system) level. Alternatively, the system calls of a specific OS can be used directly. For example in Unix/Linux OS the commands "KILL(pid, SIGSTOP)" & "KILL(pid,SIGCONT)" can be used.

Example 3

Limiting Resource Consumption of One Process to 20% in a Windows Environment

In this example, there is an interfacing stage with processes in the Operating System to get their handles, as well as with threads of a specific process, to get its handles. Then the thread is suspended for 4 seconds using "THREAD.SUSPEND" command (in .NET, for example). Then it is resumed for 1 second using "THREAD.RESUME" command (in .NET). The Suspend/Resume operations are repeated until the transaction is completed.

Example 4

Limiting Resource Consumption of One Process to 20% in an I/O (Storage) Subsystem Environment In this example, the storage device is connected and the corresponding I/O stream is identified. Then the I/O stream is suspended for 4 seconds and then it is resumed for 1 second. The Suspend/Resume operations are repeated until the I/O stream finishes.

Example 5

Limiting Resource Consumption of One Process to 20% in a Network Interface

Such as Hubs, Switches, Etc.

In this example, the corresponding stream of IP packets is identified. Then the IP packets delivery is suspended for 4 seconds and then it is resumed for 1 second. The Suspend/Resume operations are repeated until the transaction finishes.

Figure 3A:
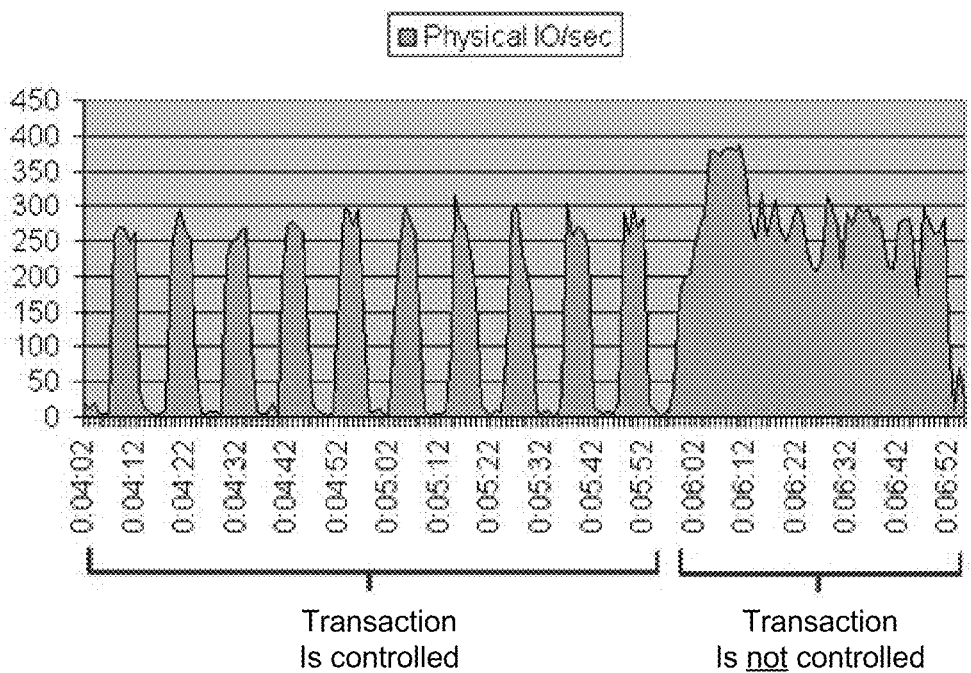
FIG. 3A is a graph that illustrates an example of how resources are controlled for a long running process, according to a preferred embodiment of the invention.

FIG. 3A is a graph that illustrates an example of how resources are controlled for a long running process, according to a preferred embodiment of the invention. In the shown example, a single heavy duty process (local disk usage time of a process, expressed in physical reads per second) is executed in a computer, causing a high I/O consumption (shown on the right). The resource consumptions of the process are limited to a level of up to 50%. This limitation is enforced by suspending the process for 5 seconds, and then resuming the process for 5 seconds and repeating the suspend/resume steps until the query is finished (shown on the left). It can be clearly seen that the distribution of the average I/O readings over time is substantially reduced, compared to uncontrolled resource allocation.

Figure 3B:
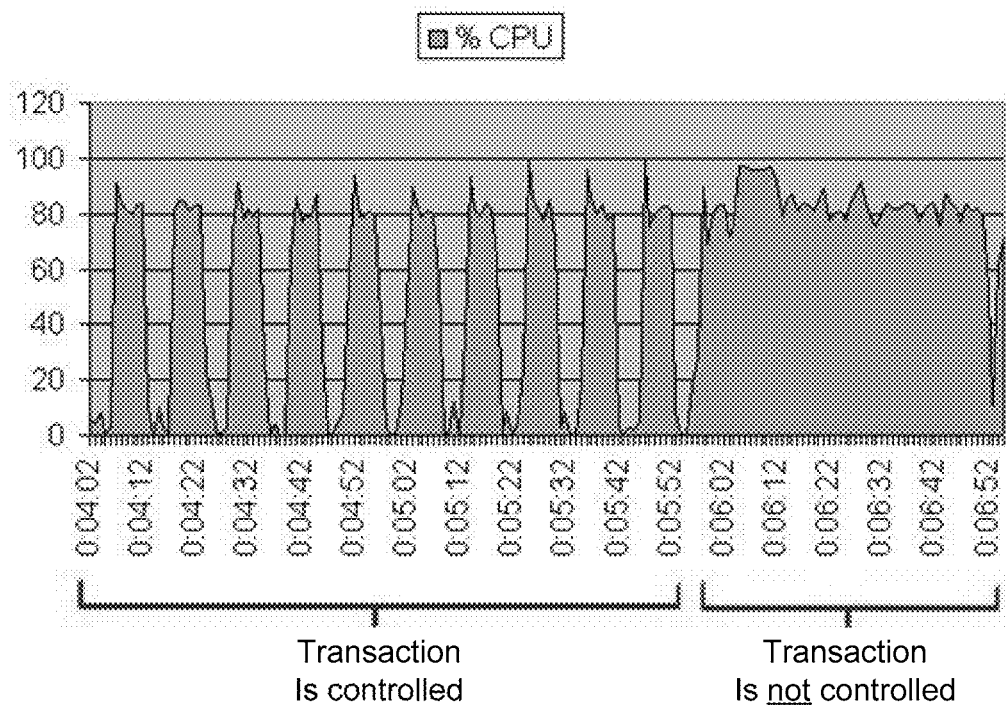
FIG. 3B is a graph that illustrates an example of how resources are controlled for a long running process, according to another preferred embodiment of the invention.

FIG. 3B is a graph that illustrates an example of how resources are controlled for a long running process, according to another preferred embodiment of the invention. In the shown example, a single heavy duty process (CPU usage time of a process) is executed in a computer, causing a high CPU consumption (shown on the right). The process is suspended and resumed while limiting the resource consumptions to a level of up to 50% (the CPU usage time with resource control is shown on the left). This limitation is enforced by suspending the process for 5 seconds, and then resuming the process for 5 seconds and repeating suspend/resume steps until the query is finished. It can be clearly seen that the distribution of the average CPU usage time is substantially reduced, compared to uncontrolled resource allocation.

Figure 4A:
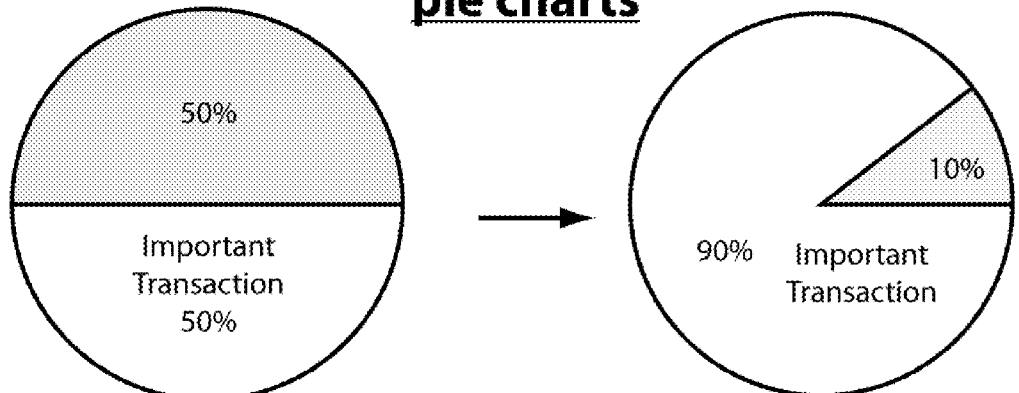
FIGS. 4A and 4B are pie-charts that illustrate how important transactions in the system can be given more resources based on the method of controlling and limiting the execution time of other running transactions.
Figure 4B:
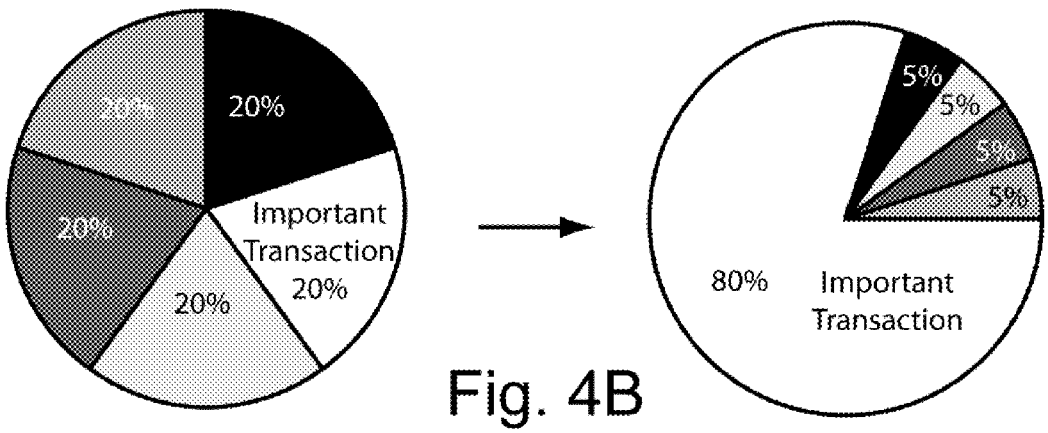

FIGS. 4A and 4B are pie-charts that illustrate how important transactions in the system can be given more resources based on the method of controlling and limiting the execution time of other running transactions.

FIG. 4A illustrates the results of controlling the resource allocation in case of two transactions, one of which is defined as an important transaction. In case when the default (uncontrolled) resource management of the Operating system is used, resources are allocated equally to both transactions (left pie-chart), such that all transactions consume the same amount of time from all resources. In case when the controlled resource management of the Operating system is used according to the present invention, 90% of the resources are allocated to the more important transaction, while limiting the resource consumption of the less important transaction to 10% (right pie-chart). Less important transactions are slowed-down by allocating them smaller chunks of execution time in order to free resources time for more important transactions.

FIG. 4B illustrates the results of controlling the resource allocation in case of several transactions, one of which is defined as an important transaction. In case when the default (uncontrolled) resource management of the Operating system is used, resources are allocated equally (20%) to all five transactions (left pie-chart). In case when the controlled resource management of the Operating system is used according to the present invention, 80% of the resources are allocated to the more important transaction, while limiting the resource consumption of the four remaining less important transactions to 5% each (right pie-chart). In both cases, this is done by allocating smaller chunks of execution time to less important transactions, to thereby slowing them down, while adding the obtained free execution time to the more important transaction(s).

Figure 4C:
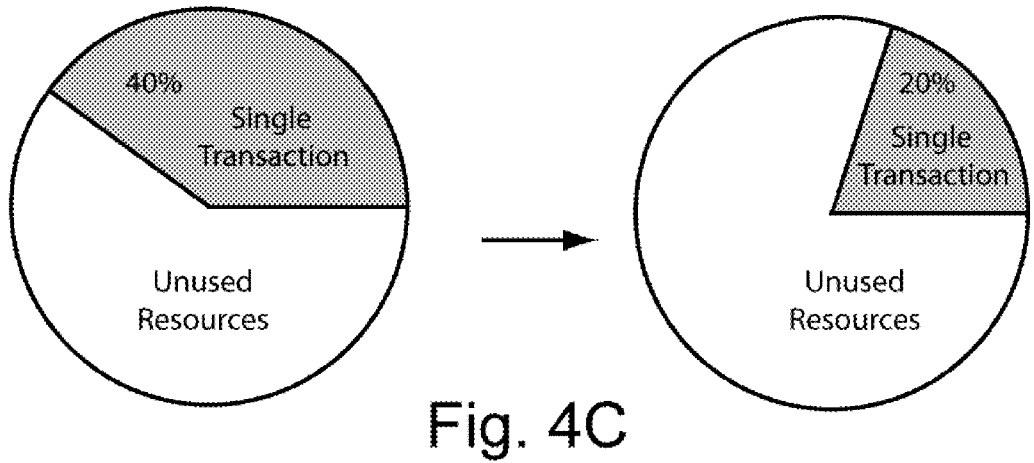
FIG. 4C illustrates the results of controlling the resource allocation to a transaction, even when not all resources are used.

FIG. 4C illustrates the results of controlling the resource allocation to a transaction, even when not all resources are used. In this case, a specific less important transaction which normally consumes 40% of the resources when there are available free resources (left pie-chart) is also managed according to the method proposed by the present invention, to consume only 20% of the resources (right pie-chart), to thereby free more resources.

Figure 5:
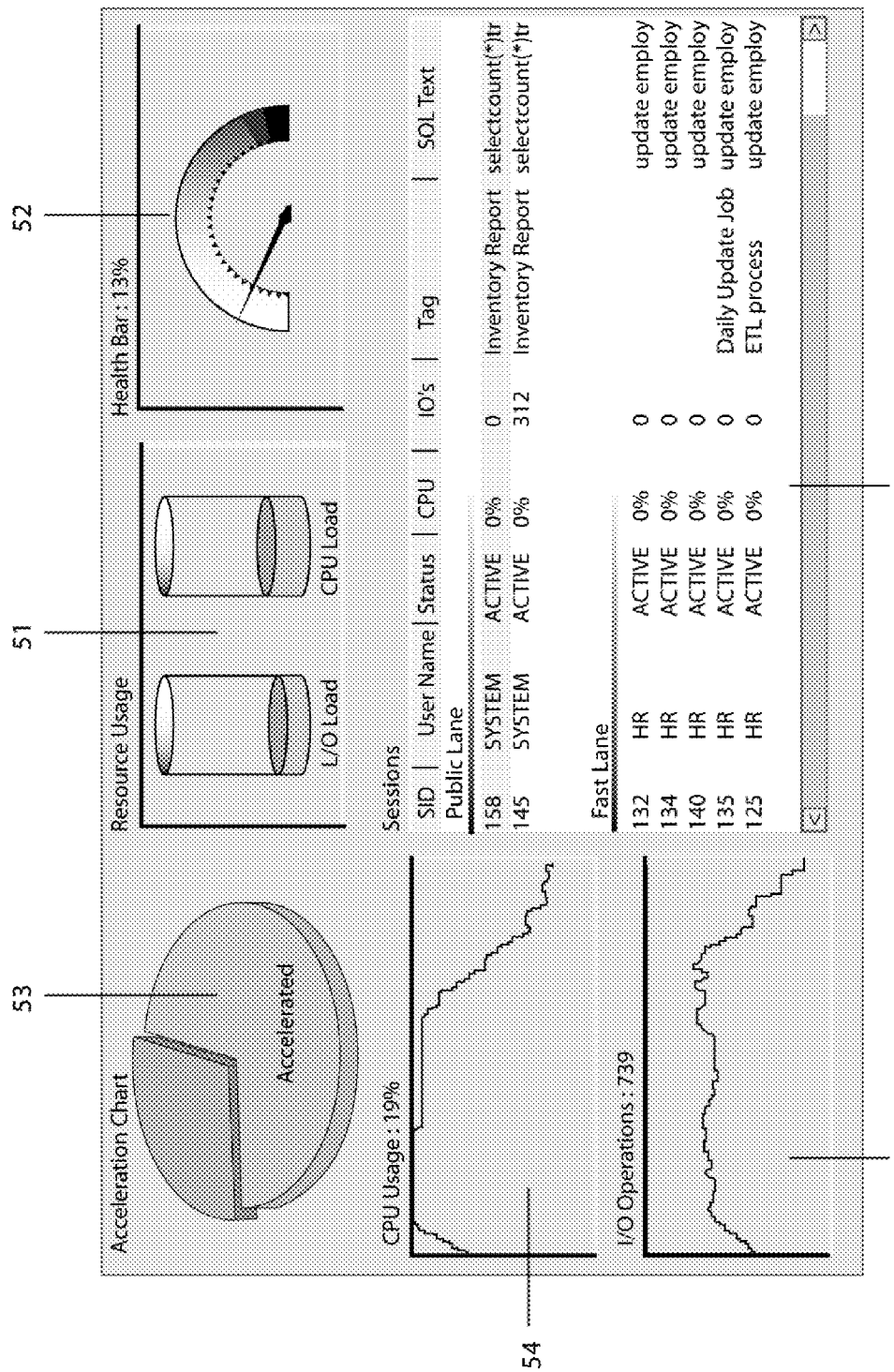
FIG. 5 illustrates an intuitive dashboard for showing the status of the system.

FIG. 5 illustrates an intuitive dashboard for showing the status of the system. A System Health Gauge uses displays the comprehensive status of the system using green color for a healthy system and red color for a system in distress. In this example, the resource usage indicators 51 show the level of usage of both CPU and I/O. The health bar 52 shows a system overall managed load of 13%. Virtual resource partition chart 53 shows the degree of accelerated processes. Panes 54, 55 and 56 show the CPU usage history, I/O transactions history and currently viewed running transactions, respectively.

Figure 6:
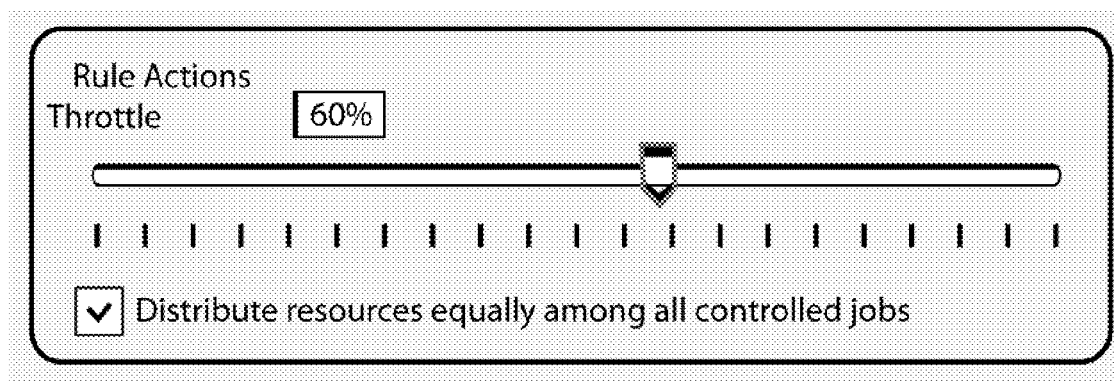
FIG. 6 illustrates a Define Rule window for slowing down the system when a transaction has started by sliding a virtual throttle slider.

When a transaction has started, the Define Rule window, shown in FIG. 6, can be used for slowing down the system by sliding the virtual throttle slider to the left, in order to prevent the selected transaction from dominating the available resources. Suitable rules may be created for type of transaction.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method, comprising:
monitoring, by a database operating in an operating system on a computer, one or more database transactions, the monitoring including determining resource usage statistics for the one or more database transactions, the resource usage statistics indicating amounts of computing resources being used by each database transaction;
obtaining, by the database, one or more rules, each rule specifying a respective condition for triggering reduction of consumption of the computing resources for each of one or more database transactions and a respective value indicating an amount of computing resources to reduce;
first identifying a database transaction in the database and by the database, including determining, based on the resource usage statistics and a first rule of the one or more rules, that resource usage statistics of the database transaction satisfy a condition specified by the first rule;
communicating, by the database, the first identifying to the operating system;
second identifying the database transaction in the operating system and by the operating system responsive to the communicating of the first identifying to the operating system, the second identifying including determining, by the operating system, a process, sub process or thread that runs and manages the database transaction in the operating system; and
managing, by the operating system and in the operating system, the process, sub process or thread, including reducing, according to the value specified in the first rule, computer resources allocated to the process, sub process or thread, wherein reducing the computer resources allocated to the process, sub process or thread in the operating system comprises periodically suspending and resuming the process, sub process or thread at a predetermined frequency for a plurality of repetitions until the database transaction finishes, wherein the predetermined frequency of the suspending and the resuming in the plurality of repetitions is configured to correspond to the value specified in the first rule, and wherein the predetermined frequency is specified in the first rule.

2. The method of claim 1, wherein reducing the computer resources allocated to the process or thread that performs the database transaction comprises:
reallocating computing resources allocated to the process, sub process or thread to another process or thread upon suspending the process, sub process or thread; and
satisfying computing resources requests by the process, sub process or thread upon resuming the process, sub process or thread, wherein
in each repetition of the suspending and the resuming the process, sub process or thread, a ratio between an amount of time the process or thread is suspended and an amount of time the process, sub process or thread is resumed is configured to correspond to the value specified in the rule.

3. The method of claim 2, wherein suspending the process, sub process or thread is carried out through an inherent API.

4. The method of claim 2, wherein suspending the process, sub process or thread is carried out through a debugger.

5. The method of claim 2, wherein suspending and resuming the process, sub process or thread is carried out directly through system calls of the operating system or using a binary code or another representation of a command for suspending and resuming processes.

6. The method of claim 1, wherein the one or more database transactions are multiple transactions;

each of the multiple transactions has a respective type;

the one or more rules comprise multiple rules, each created for a respective type of transaction; and each of the multiple rules is applied to control database transactions having a type matching the type of the rule.

7. The method of claim 1, wherein the value in the first rule is represented as a ratio between the amount of computing resources the process, sub process or thread is allowed to consume and an amount of computing resources the process, sub process or thread requests.

8. The method of claim 1, wherein:

the first rule specifies an input/output (I/O) threshold for I/O computing resources; the method further comprising:

determining, based on the resource usage statistics and the first rule, that the I/O computing resources being used by the database transaction exceeds the I/O threshold; and reducing I/O computing resources allocated to the process or thread by periodically suspending and resuming operation of I/O computing resources used by the process, sub process or thread at the predetermined frequency.

9. The method of claim 7, wherein the ratio corresponds to a level of importance assigned to the database transaction.

10. The method of claim 7, wherein the ratio is time-based or user-based and having a specified value that is applicable during time designated as peak hours or for processes from users designated as managers.

11. The method of claim 10, wherein suspending the operations includes at least one of causing the process, sub process or thread to demand fewer resources, suspending the process, sub process or thread using an operating system command, or suspending the process, sub process or thread using a database command issued by the operating system.

12. The method of claim 1, comprising accelerating or slowing down the process, sub process or thread using a graphical user interface (GUI) for controlling the computing resources allocated to the process, sub process or thread.

13. The method of claim 12, wherein the GUI includes a sliding virtual throttle.

14. The method of claim 1, wherein the method is performed when each of the one or more database transactions is already executing and consuming computing resources.

15. The method of claim 1, wherein value specified in the rule is determined based on an input received through a slider user interface item.

16. A system, comprising:

one or more processors; and a non-transitory storage device storing instructions that, when executed by the one or more processors, causes the one or more processors to perform operations comprising:

monitoring, by a database operating in an operating system, one or more database transactions, including determining resource usage statistics for the one or more database transactions, the resource usage statistics indicating amounts of computing resources being used by each database transaction;

obtaining, by the database, one or more rules, each rule specifying a respective condition for triggering reduction of consumption of the computing resources for each of one or more database transactions and a respective value indicating an amount of computing resources to reduce;

first identifying a database transaction in the database and by the database, including determining, based on the resource usage statistics and a first rule of the one or more rules, that resource usage statistics of the database transaction satisfy a condition specified by the first rule;

communicating, by the database, the first identifying to the operating system;

second identifying the database transaction in the operating system and by the operating system responsive to the communicating of the first identifying to the operating system, the second identifying including determining, by the operating system, a process, sub process or thread that runs and manages the database transaction in the operating system; and managing, by the operating system and in the operating system, the process, sub process or thread, including reducing, according to the value specified in the first rule, computer resources allocated to the process, sub process or thread, wherein reducing the computer resources allocated to the process, sub process or thread in the operating system comprises periodically suspending and resuming the process, sub process or thread at a predetermined frequency for a plurality of repetitions until the database transaction finishes, wherein the predetermined frequency of the suspending and the resuming in the plurality of repetitions is configured to correspond to the value specified in the first rule, and wherein the predetermined frequency is specified in the first rule.

17. A non-transitory storage device storing instructions that, when executed by a processor, causes the one or more processors to perform operations comprising:

monitoring, by a database operating in an operating system, one or more database transactions, including determining resource usage statistics for the one or more database transactions, the resource usage statistics indicating amounts of computing resources being used by each database transaction;

obtaining, by the database, one or more rules, each rule specifying a respective condition for triggering reduction of consumption of the computing resources for each of one or more database transactions and a respective value indicating an amount of computing resources to reduce;

first identifying a database transaction in the database and by the database, including determining, based on the resource usage statistics and a first rule of the one or more rules, that resource usage statistics of the database transaction satisfy a condition specified by the first rule;

communicating, by the database, the first identifying to the operating system;

second identifying the database transaction in the operating system and by the operating system responsive to the communicating of the first identifying to the operating system, the second identifying including determining, by the operating system, a process, sub process or thread that runs and manages the database transaction in the operating system; and managing, by the operating system and in the operating system, the process, sub process or thread, including reducing, according to the value specified in the first rule, computer resources allocated to the process, sub process or thread, wherein reducing the computer resources allocated to the process, sub process or thread in the operating system comprises periodically suspending and resuming the process, sub process or thread at a predetermined frequency for a plurality of repetitions until the database transaction finishes, wherein the predetermined frequency of the suspending and the resuming in the plurality of repetitions is configured to correspond to the value specified in the first rule, and wherein the predetermined frequency is specified in the first rule.

18. The non-transitory storage device of claim 17, wherein:

the first rule specifies an input/output (I/O) threshold for I/O computing resources; the operations further comprising:

determining, based on the resource usage statistics and the first rule, that the I/O computing resources being used by the database transaction exceeds the I/O threshold; and as a consequence of the determining, reducing I/O computing resources allocated to the process, sub process, or thread by periodically suspending and resuming operation of I/O computing resources used by the process, sub process, or thread at the predetermined frequency.

* * * * *

UNITED STATES PATENT AND TRADEMARK OFFICE
CERTIFICATE OF CORRECTION

PATENT NO.         : 9,582,337 B2
APPLICATION NO.    : 12/467387
DATED              : February 28, 2017
INVENTOR(S)        : Eliran Malki et al.

Page 1 of 1

It is certified that error appears in the above-identified patent and that said Letters Patent is hereby corrected as shown below:

In the Specification

Column 1, Line 11: Delete "2006)," and insert --2006; expired),--, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*